US012601620B2

(12) United States Patent
Sailer

(10) Patent No.: US 12,601,620 B2
(45) Date of Patent: Apr. 14, 2026

(54) MEASURING DEVICE FOR METERING FLUIDS, AND METHOD FOR METERING BY MEANS OF A MEASURING DEVICE OF THIS TYPE

(71) Applicant: AVL LIST GMBH, Graz (AT)

(72) Inventor: Wolfgang Sailer, Graz (AT)

(73) Assignee: AVL LIST GMBH, Graz (AT)

( * ) Notice: Subject to any disclaimer, the term of this patent is extended or adjusted under 35 U.S.C. 154(b) by 367 days.

(21) Appl. No.: 18/036,410

(22) PCT Filed: Nov. 10, 2021

(86) PCT No.: PCT/AT2021/060425
§ 371 (c)(1),
(2) Date: May 11, 2023

(87) PCT Pub. No.: WO2022/099340
PCT Pub. Date: May 19, 2022

(65) Prior Publication Data
US 2024/0003727 A1      Jan. 4, 2024

(30) Foreign Application Priority Data

Nov. 11, 2020    (AT) .............................. A 50974/2020

(51) Int. Cl.
*G01F 1/36*          (2006.01)
*G01F 1/698*         (2006.01)
                     (Continued)

(52) U.S. Cl.
CPC .............. *G01F 1/363* (2013.01); *G01F 1/698* (2013.01); *G01F 1/8427* (2013.01); *G01F 1/88* (2013.01); *G01F 1/90* (2013.01); *G01F 15/005* (2013.01)

(58) Field of Classification Search
CPC ........... G01F 1/00–90; G01F 11/00–46; G01F 15/00–185; G01F 25/00–24;
(Continued)

(56) References Cited

U.S. PATENT DOCUMENTS

| | | | | | |
|---|---|---|---|---|---|
| 1,094,167 | A | * | 4/1914 | Riotte ........................ | F02D 9/00 137/481 |
| 6,249,748 | B1 | * | 6/2001 | Fu ............................. | G01F 1/34 702/50 |

(Continued)

FOREIGN PATENT DOCUMENTS

| | | | | |
|---|---|---|---|---|
| CN | 104748970 A | | 7/2015 | |
| CN | 108151833 A | * | 6/2018 | ............. G01F 23/68 |

(Continued)

*Primary Examiner* — Justin N Olamit
(74) *Attorney, Agent, or Firm* — Norman B. Thot

(57) ABSTRACT

A measuring device for metering a fluid. The measuring device includes a container with the fluid, a fluid inlet which is fluidically connected to the container, a fluid outlet which is fluidically connectable with a metering point, a metering line which connects the fluid inlet with the fluid outlet, a delivery pump arranged in the metering line, a density sensor arranged in the metering line, a flow meter arranged in the metering line, and a recirculation line which is arranged to branch off from the metering line downstream of the flow meter and to open into the container. The flow meter is arranged in a measuring unit housing which is arranged at a distance from a pump unit housing in which at least the delivery pump is arranged. The pump unit housing is detachably connected to the measuring unit housing via a connection portion of the metering line.

21 Claims, 1 Drawing Sheet

(51) Int. Cl.

| | |
|---|---|
| *G01F 1/84* | (2006.01) |
| *G01F 1/88* | (2006.01) |
| *G01F 1/90* | (2006.01) |
| *G01F 15/00* | (2006.01) |

(58) Field of Classification Search

CPC ............... F01M 1/12; F02D 33/00–02; F02D 41/00–408; F02M 37/00–54

See application file for complete search history.

(56) References Cited

U.S. PATENT DOCUMENTS

| | | | | |
|---|---|---|---|---|
| 6,471,487 | B2 * | 10/2002 | Keilty | G05D 7/0688 |
| | | | | 417/279 |
| 7,980,093 | B2 * | 7/2011 | Kuehl | F25D 11/025 |
| | | | | 62/467 |
| 8,695,410 | B2 * | 4/2014 | Gushman | F02M 31/20 |
| | | | | 73/114.42 |
| 9,322,683 | B2 * | 4/2016 | Brosnihan | G01F 1/3259 |
| 9,435,673 | B2 * | 9/2016 | Tartler | G01F 25/10 |
| 11,099,043 | B2 * | 8/2021 | Maginnis | G01F 25/10 |
| 11,981,454 | B2 * | 5/2024 | Hageman | B67D 7/14 |
| 2002/0100505 | A1 | 8/2002 | Keilty et al. | |
| 2004/0045609 | A1 | 3/2004 | Apostolides | |
| 2004/0211263 | A1 | 10/2004 | Wiesinger et al. | |
| 2006/0277982 | A1 | 12/2006 | Christian et al. | |
| 2017/0218893 | A1 | 8/2017 | Duerrwaechter et al. | |

FOREIGN PATENT DOCUMENTS

| | | | | | |
|---|---|---|---|---|---|
| CN | 209625045 | U | * | 11/2019 | |
| CN | 211174558 | U | | 8/2020 | |
| EP | 1 285 169 | A2 | | 2/2003 | |
| EP | 1 356 254 | A2 | | 10/2003 | |
| EP | 1 729 100 | A1 | | 12/2006 | |
| EP | 3 172 426 | A1 | | 5/2017 | |
| JP | H07270211 | A | * | 10/1995 | |
| PL | 184742 | B1 | * | 12/2002 | ........... B65B 31/003 |
| WO | WO 2019/011594 | A1 | | 1/2019 | |

* cited by examiner

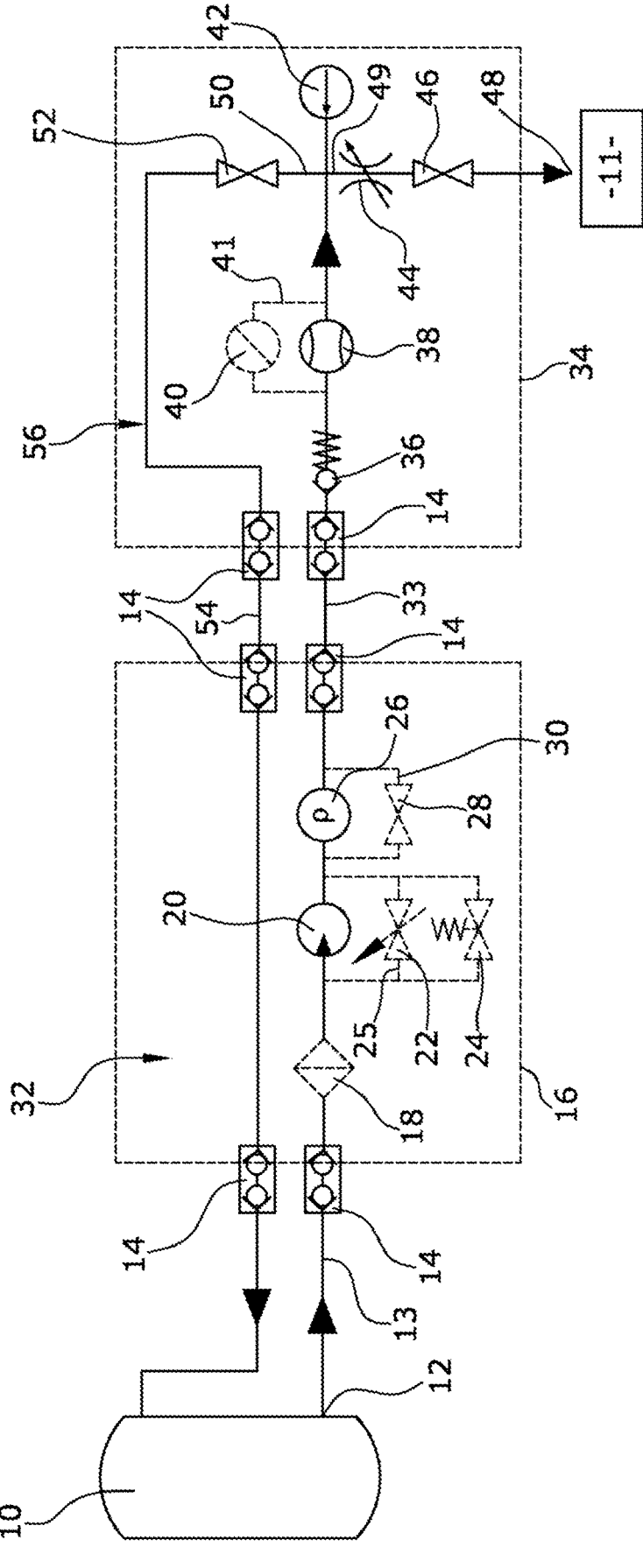

MEASURING DEVICE FOR METERING FLUIDS, AND METHOD FOR METERING BY MEANS OF A MEASURING DEVICE OF THIS TYPE

CROSS REFERENCE TO PRIOR APPLICATIONS

This application is a U.S. National Phase application under 35 U.S.C. § 371 of International Application No. PCT/AT2021/060425, filed on Nov. 10, 2021 and which claims benefit to Austrian Patent Application No. A50974/2020, filed on Nov. 11, 2020. The International Application was published in German on May 19, 2022 as WO 2022/099340 A1 under PCT Article 21(2).

FIELD

The present invention relates to a measuring device for metering fluids with a container in which the fluid is stored, a fluid inlet which is fluidically connected to the container, a fluid outlet which is fluidically connectable with a metering point, a metering line via which the fluid inlet is connected to the fluid outlet and in which a delivery pump, a density sensor, and a flow meter are arranged, and with a recirculation line which branches off from the metering line downstream of the flow meter and opens into the container. The present invention also relates to a method for metering with such a measuring device.

BACKGROUND

Such measuring devices are used, for example, for oil consumption measurements on test stands of internal combustion engines, wherein the consumption measurements can be made on engines from the automotive sector as well as on large engines. The challenge with these measuring devices is that it must be possible to measure both small quantities of oil of about 10 g to be re-metered with a precision of about 1 g while also being possible to fill a complete oil pan with a measurement uncertainty of 1%, as is necessary, for example, for a test stand preparation or an oil pan calibration procedure. The required accuracies must also be maintained in the presence of vibrations.

A device for measuring fluid consumption is described in EP 1 729 100 A1. This device comprises a continuously operating flow sensor, a pressure regulator and a delivery pump arranged in a metering line, and a recirculation line for returning the fluid to the container, as well as a conditioning device comprising at least one heat exchanger which serves to generate an average temperature of the fluid and to stabilize the energy in the measuring circuit. The complexity of this apparatus is relatively high so that a large space requirement exists. This is particularly undesirable because this device must be arranged in the immediate vicinity of the engine to avoid measurement errors due to temperature gradients between the flow sensor and the internal combustion engine so as to avoid metering errors caused by the thermal expansion of the fluid in the metering line. These errors are mainly caused by different ambient temperatures at the measuring device or at the container, in particular at the oil tank and at the metering point or at the consumer.

SUMMARY

An aspect of the present invention is to provide a measuring device for metering fluids and a corresponding method with which both small quantities of subsequently metered fluids and large quantities with high flow rates can be measured with high precision. The space required in the vicinity of the metering point is thereby to be minimized. It is also desirable that the measuring accuracy is maintained even during longer pauses or changes of the ambient temperature. The manufacturing costs should nevertheless be reduced.

In an embodiment, the present invention provides a measuring device for metering a fluid. The measuring device includes a container in which the fluid is stored, a fluid inlet which is fluidically connected to the container, a fluid outlet which is fluidically connectable with a metering point, a metering line which connects the fluid inlet with the fluid outlet, a delivery pump arranged in the metering line, a density sensor arranged in the metering line, a flow meter arranged in the metering line, and a recirculation line which is arranged to branch off from the metering line downstream of the flow meter and to open into the container. The flow meter is arranged in a measuring unit housing which is arranged at a distance from a pump unit housing in which at least the delivery pump is arranged. The pump unit housing is detachably connected to the measuring unit housing via a connection portion of the metering line.

BRIEF DESCRIPTION OF THE DRAWING

The present invention is described in greater detail below on the basis of embodiments and of the drawing in which:

The FIGURE shows a flow diagram of a measuring device according to the present invention.

DETAILED DESCRIPTION

The measuring device comprises a container in which the fluid, such as oil, is stored. A fluid inlet is fluidically connected to the container, while a fluid outlet is fluidically connectable with a metering point, which can be a consumer, such as an internal combustion engine, but can also be an oil pan. A metering line is arranged between the fluid inlet and the fluid outlet in which a delivery pump, a density sensor, and a flow meter are arranged. A recirculation line branches off from the metering line downstream of the flow meter and opens into the container so that the fluid can be circulated between measurements. The flowmeter is arranged in a measuring unit housing according to the present invention. This is arranged with a distance, which can be several meters, to a pump unit housing in which at least the delivery pump is arranged. The pump unit housing is detachably connected to the measuring unit housing via a connection portion of the metering line so that the fluid can flow from the pump unit housing into the measuring unit housing via the connection portion. This makes it possible to minimize the space required at the metering point and still provide that the measured mass flow corresponds to the mass flow actually supplied to the metering point, since the close spatial arrangement provides that the same temperatures and thus the same densities of the fluid can be assumed. The container, which may need a large space depending on the measurement to be made, and the pump unit housing can accordingly be arranged in another room or at any position spaced apart from the metering unit housing. Coriolis meters can be used as flow meters, however, because of their small cross-sections, Coriolis meters generate a greater pressure loss so that, in the case of highly viscous fluids, these are mostly replaced by positive displacement meters, the use of which requires the temperature and density to be measured for calculation into a mass flow.

The present invention also provides a method in which, prior to metering, the fluid is circulated via the recirculation line, wherein the fluid is discharged from the lower region of the container and returned to the upper region of the container. This purging process results in a temperature equalization over the entire circuit. Temporal temperature changes of the fluid during the measurement are thereby significantly reduced, which also eliminates and/or at least slows down and minimizes the density changes that would otherwise result, which could lead to measurement errors. Temperature changes during subsequent measurements thus occur only very inertly.

The density sensor can, for example, be arranged in the pump unit housing downstream of the delivery pump in the metering line. This in particular serves for the calculation of a volumetric throughflow into a mass flow. When the density sensor is arranged in the pump unit housing, a calculation of the base density measured by the density sensor into the actual media density at the flow meter is carried out via a known thermal expansion coefficient dependent on the fluid, for which the temperature there present must be known.

It is further advantageous if a filter is arranged in the delivery pump housing upstream of the delivery pump in the metering line. The filter serves to filter out contaminants from the fluid so that damage to the density sensor, the flow meter, or the delivery pump is avoided.

In an embodiment of the present invention, a check valve can, for example, be arranged in the metering unit housing upstream of the flow meter in the metering line, via which a backflow of the fluid through the flow meter, which can lead to measurement errors, is prevented.

A temperature sensor is also arranged in the measuring unit housing located immediately downstream of the flow meter in the metering line. The temperature sensor is used to calculate the correct density of the fluid when converting a volumetric throughflow to a mass flow.

A throttle is also arranged downstream of the flow meter to protect the flow meter from damage or malfunction due to excessive applied pressure differences, which pressure differences are delimited to permissible values by the throttle.

A shut-off valve is additionally arranged upstream of the fluid outlet, wherein the line between the fluid outlet and the shut-off valve should be configured to be as short as possible. The shut-off valve is closed when the fluid flows through the recirculation line and between measurements in order to be able to separate the measuring unit from the metering point.

A fluid recirculation valve should also be arranged in the recirculation line to be able to shut off the recirculation line during measurements.

A differential pressure sensor can, for example, be arranged on the metering line in the measuring unit housing to measure a differential pressure via the flow meter. The differential pressure sensor provides that the pressure loss in the flow meter does not become too great. Depending on the data from the differential pressure sensor, the throttle can be accordingly readjusted if the pressure differences are too high. The differential pressure sensor can also be used to record the respective differential pressures at the flow meter when calibrating the flow meter with different flow rates, which are dependent on the viscosity of the measured medium. If this calibration is repeated with several media of different viscosities, especially when using a positive volume displacement meter, the measurement accuracy can subsequently be improved during a measurement process by including this calibration data in the event of any changes in the viscosity of the measured medium.

The density sensor in the pump unit housing can advantageously be bypassed via a shut-off device. An undesirably high pressure loss occurring at the density sensor, which can in particular occur when measuring highly viscous fluids, can thereby be eliminated from the measuring circuit.

It can also be advantageous if the delivery pump can be bypassed via a proportional valve, since the delivery flow in the metering line can thereby be adjusted by changing the flow resistance in this bypass line. This is particularly necessary to reduce the volumetric throughflow before the end of a batch metering operation and to thus be able to set an exact metering quantity.

It is furthermore useful if the delivery pump can be bypassed via a safety valve. This serves to protect the downstream components and hose lines from excessive pressures.

The recirculation line can, for example, branch geodetically upwards from the metering line downstream of the flow meter. Air bubbles which are located between the flow meter and the branch of the recirculation line at the start of metering are thus discharged upwards towards the recirculation line due to the lower density instead of being conveyed towards the metering point where they would lead to large measuring errors. These air bubbles are reliably discharged towards the container in subsequent purging processes.

In an embodiment of the present invention, the metering line can, for example, extend downstream of the flow meter in a descending direction so that air bubbles from this area of the metering line are also discharged into the recirculation line and incorrect measurements are avoided.

The metering line can, for example, extend upward from the fluid outlet, wherein the shut-off valve and the throttle are arranged in the portion of the metering line extending upward. Air bubbles can thereby be reliably removed from the entire area between the branch of the recirculation line and the fluid outlet.

In a more advanced configuration of the present invention, the metering line extends continuously upward from the fluid outlet into the recirculation line to the fluid recirculation valve. This continuous configuration provides that existing air bubbles actually reach the recirculation line and can thus be removed from the system during the purging process.

The continuously upwardly extending portion of the metering line can, for example, be made of a material with a heat conduction coefficient of more than 30 W/mK and is thermally insulated. Due to this good thermal conduction at the metering line and the simultaneous insulation to the outside, the heat of the fluid in the system during a purging process is also transferred to the unpurged area where the throttle and the shut-off valve are arranged. Temperature differences between this portion of the metering line and the rest of the metering line, which could lead to measurement errors, can thereby be eliminated or at least significantly reduced.

In an embodiment, the flow meter can, for example, be a Coriolis flow meter or a positive volume displacement meter. With the Coriolis flow meter, a mass flow can be determined directly and without additional calculation steps, however, this causes increased pressure losses due to narrow pipe cross-sections, in particular at high viscosities of the measuring fluid. A rotary displacement meter is used in these cases whose measured volumetric throughflow can also be calculated into a mass flow via the density and also provides precise measured values.

The throttle is advantageously configured as a sleeve inserted into the metering line for cross-sectional constriction. This has the advantage of providing a very cost-effective solution and the throttle function of reducing the pressure difference across the flow metering line and reducing the cross-section of the flow, thereby resulting in a rapid adjustment of the temperature in the area of the throttle to the temperature of the purged portion of the metering line.

In an embodiment of the method according to the present invention, the fluid recirculation valve can, for example, be opened and the shut-off valve in the metering line in the metering unit housing can, for example, be closed before metering. The fluid is then circulated by the delivery pump until the temperature of the fluid at the temperature sensor is approximately constant. This means that the circulating fluid causes the entire system to adjust to an average temperature of the fluid. The delivery pump is then switched off and the fluid recirculation valve is closed. The shut-off valve is subsequently opened for metering and measuring the mass flow so that the delivery pump delivers the fluid to the metering point while the mass flow is measured via the flow meter.

A measuring device for metering fluids and a method for metering fluids with such a measuring device are thus provided with which errors due to temperature differences in the system are significantly reduced by temperature compensation in the system. It nevertheless becomes possible to place the measuring unit close to the metering point with little space requirement, while the container with the fluid and the pump unit can be configured at a greater distance therefrom. This minimizes the space required at the test stand and avoids measurement errors due to temperature differences between the measuring point and the metering point. Measurement errors caused by metering lines leading to a metering point with fluid standing stationary therein are eliminated. Very precise measured values are thus obtained with a simple and inexpensive design.

An embodiment of a measuring device for metering fluids according to the present invention is shown in the drawing and is described below with the corresponding method according to the present invention.

The measuring device according to the present invention comprises a container 10 in which the fluid to be metered is stored. This can, for example, be an oil sump that provides oil to a metering point 11, such as a large internal combustion engine on a test stand, wherein the oil consumption is to be measured.

An opening is configured in the lower portion of the container 10, which defines a fluid inlet 12 into a metering line 13. This portion of the metering line 13 is configured as a hose line and is connected via a hose coupling 14 with a pump unit housing 16, in which the metering line 13 continues.

A filter 18 is arranged in the metering line 13 in the pump unit housing 16, via which solids are separated from the fluid flow. This metering line extends further to a delivery pump 20, via which the fluid is delivered from the container 10 and through the metering line 13. In the present embodiment, the delivery pump 20 can optionally be bypassed via a proportional valve 22 or a safety valve 24. The safety valve 24 protects the lines, components, and couplings of the measuring device from excessive pressures by opening the safety valve 24 when the pressure is too high, causing the pump pressure of the delivery pump 20 to drop. The proportional valve 22 arranged alternatively or additionally in a further bypass line 25 bypassing the delivery pump 20 serves to regulate the flow cross-section and thus the flow resistance in the bypass line 25, whereby the flow rate in the metering line 13 can be changed, for example, in order to be able to set an exact metering stop time by slowly reducing the metered mass flow before the end of metering.

A density sensor 26 is also arranged in the metering line 13 in the pump unit housing 16, via which the density of the fluid is measured for the calculation of a volumetric throughflow into a mass flow. This density is temperature-dependent so that an actual density in the area of a volume flow measurement depending on the temperature there must be calculated from the density measured by the density sensor 26. In the event that the flow resistance of the density sensor 26 is too high, so that the desired flow rate in the metering line 13 cannot be achieved, a bypass line 30 bypassing the density sensor 26 is provided, in which a shut-off element 28 is arranged, so that the bypass line 30 can be opened or closed, wherein when the bypass line 30 is opened, the flow rate in the metering line 13 and at the metering point 11 is increased.

In the present embodiment, the delivery pump 20 with the filter 18 and the density sensor 26 as well as the described valves 22, 24, 28 and bypass lines 25, 30 thus define a pump unit 32 arranged in the pump unit housing 16.

Downstream of the density sensor 26, the metering line 13 initially opens at a further hose coupling 14 provided at the pump unit housing 16, to which a connection portion 33 of the metering line 13 is attached according to the present invention, wherein any other coupling is also possible in the sense of the present invention. This connection portion 33 leads to a further hose coupling 14 which is attached to a measuring unit housing 34 so that the pump unit housing 16 and the measuring unit housing 34 can be arranged at any distance from one another.

The metering line 13 continues in the metering unit housing 34. A check valve 36 is arranged in the metering line 13 in the metering unit housing 34 upstream of a flow meter 38 which prevents fluid from flowing in the reverse direction through the flow meter 38. Depending on the viscosity present, the flow meter 38 is configured as a Coriolis flow meter or as a positive volume displacement meter, such as a gear meter, oval gear meter, or screw meter.

A differential pressure sensor 40 can be arranged in a pressure line 41 bypassing the flow meter 38, via which the pressure drop across the flow meter 38 can be determined, which is particularly useful if the flow meter is one in which the pressure drop during operation must not exceed a defined value. An adjustable throttle 44 is in this case arranged downstream of the flow meter 38 in the metering line 13 in the metering unit housing 34 via which the pressure drop across the flow meter 38 can be adjusted as a function of the measured values of the differential pressure sensor 40.

A temperature sensor 42 is furthermore arranged in the immediate vicinity of the flow meter 38 via which the fluid temperature is measured, which fluid temperature is used both to assess whether there is an approximately uniform temperature distribution in the entire measuring device and to be able to make a correction to the density for the calculation of a mass flow.

Downstream of the throttle 44, a shut-off valve 46 is arranged in the metering line 13 upstream of a fluid outlet 48, via which the connection to the metering point 11 is established. The shut-off valve 46 serves to fluidically separate the measuring device from the metering point 11.

A recirculation line 50 branches off from the metering line 13 between the flow meter 38 and the throttle 44, in which a fluid recirculation valve 52 is arranged, which is configured as a switching valve so that the recirculation line 50 can be opened or closed. The recirculation line 50 leads into the pump unit housing via a connection portion 54 between the measuring unit housing 34 and the pump unit housing 16, and opens downstream of the pump unit housing into an upper region of the container 10. The individual conduit portions within and outside the pump unit housing 16 and the measuring unit housing 34 are again connected via hose couplings 14, wherein any other connections of the line portions are here also possible.

In the present embodiment, the flow meter 38 with its pressure line 41, the check valve 36, the throttle 44, the shut-off valve 46, the fluid recirculation valve 52, and the temperature sensor 42 define a measuring unit 56 which is arranged in the common measuring unit housing 34, which requires little installation space, and which can be arranged in the immediate vicinity of the metering point 11.

A downstream portion 49 of the metering line 13 extends continuously upwards from the fluid outlet 48 via the shut-off valve 46 and via the throttle 44 into the recirculation line 50 in the measuring unit housing 34. This downstream portion 49 should also be placed as close as possible to the flow meter 38. This is to prevent gas bubbles between the flow meter 38 and the fluid outlet 48 from rising into the recirculation line 50 and thus from reaching the metering point 11, which would lead to a falsification of the measurement results, since these gas bubbles would also be measured as a filled line portion at the flow meter 38 if the gas bubbles were not discharged.

A purging process is first carried out before each metering process according to the present invention. For this purpose, the shut-off valve 46 is closed and the fluid recirculation valve 52 is opened. By energizing the delivery pump 20, the fluid is then conveyed in a circuit out of the container 10 via the metering line 13 and the recirculation line 50 and back into the container 10 via the pump unit 32 and the measuring unit 56, as a result of which the gas bubbles are first conveyed out of the portion of the recirculation line 50 upstream of the fluid recirculation valve 52 into the container 10 and can thus no longer falsify any measurements. This conveying also has the effect of equalizing the temperature between the various portions of the metering line 13, the container 10, and the recirculation line 50, since an average temperature is established as a result of the discharge into the upper portion of the container 10 and the delivery from the lower portion of the container 10 and the uniform flow through all line portions, which is independent of the distance of the container 10 to the pump unit 32 and of the pump unit 32 to the measuring unit 56 and which can be measured by the temperature sensor 42, so that metering, if desired, is only started when, over a defined period of time, the temperature differences move within a predefined interval. As soon as this is achieved, the delivery pump 20 is initially switched off, and the fluid recirculation valve 52 is closed. To start the metering process, the delivery pump 20 is switched on again and the shut-off valve 46 is opened so that the fluid is now conveyed from the container 10 via the delivery pump 20 and the flow meter 38 to the fluid outlet and thus to the metering point. This also provides that the entire mass flow occurs exclusively via the metering line 13. During operation, the flow meter 38 measures the mass flow or volumetric throughflow passed through it and thus supplied to the metering point 11, which can be calculated into a mass flow using the determined density.

The temperature of the fluid remains almost constant during this process so that very precise measuring results are achieved. Errors due to a distance and a temperature difference between the flow meter 38 and the metering point 11 possibly caused by this distance are also avoided since the measuring unit 56 can be arranged in close vicinity to the metering point 11 without requiring more space in that the pump unit 32 and the container 10 can be arranged at a distance of several meters from the measuring unit 56 since the measuring device is divided into different units which are connected to each other only by detachable lines. Both large and small metering quantities can be determined very precisely via such a measuring device. The measuring accuracy is maintained even with longer pause times or changed ambient temperatures. This setup is nevertheless very cost-effective since few components are required. There is no need, for example, for heat exchangers to establish temperature equilibrium. Measurement errors due to gas bubbles in the metering line are also reliably avoided.

It should be clear that the scope of protection of the present invention is not delimited to the above described embodiments. All components shown in dashed lines are thus merely optional. The density sensor can also be arranged at any position or in an additional bypass line. The recirculation line can also be routed outside the pump unit housing, thus connecting the container directly with the measuring unit. Instead of the adjustable throttle, a cross-sectional constriction via an inserted sleeve can be used to reduce the pressure difference at the flow meter. If necessary, a throttle can also be eliminated, in particular for positive volume displacement meters. Reference should also be had to the appended claims.

LIST OF REFERENCE NUMERALS

10 Container
11 Metering point
12 Fluid inlet
13 Metering line
14 Hose coupling
16 Pump unit housing
18 Filter
20 Delivery pump
22 Proportional valve
24 Safety valve
25 Bypass line
26 Density sensor
28 Shut-off element
30 Bypass line
32 Pump unit
33 Connection portion
34 Measuring unit housing
36 Check valve
38 Flow meter
40 Differential pressure sensor
41 Pressure line
42 Temperature sensor
44 Adjustable throttle
46 Shut-off valve
48 Fluid outlet
49 Downstream portion
50 Recirculation line
52 Fluid recirculation valve
54 Connection portion
56 Measuring unit

What is claimed is:

1. A measuring device for metering a fluid, the measuring device comprising:
a container in which the fluid is stored;
a fluid inlet which is fluidically connected to the container;
a fluid outlet which is fluidically connectable with a metering point;
a metering line which connects the fluid inlet with the fluid outlet;
a delivery pump arranged in the metering line;
a density sensor arranged in the metering line;
a flow meter arranged in the metering line; and
a recirculation line which is arranged to branch off from the metering line downstream of the flow meter and to open into the container,
wherein,
the flow meter is arranged in a measuring unit housing which is arranged at a distance from a pump unit housing in which at least the delivery pump is arranged,
the pump unit housing is detachably connected to the measuring unit housing via a connection portion of the metering line, and
the density sensor is arranged in the pump unit housing downstream of the delivery pump in the metering line.

2. The measuring device as recited in claim 1, further comprising:
a filter which is arranged in the pump unit housing upstream of the delivery pump in the metering line.

3. The measuring device as recited in claim 1, further comprising:
a non-return valve which is arranged in the measuring unit housing upstream of the flow meter in the metering line.

4. The measuring device as recited in claim 1, further comprising:
a temperature sensor which is arranged in the measuring unit housing downstream of the flow meter in the metering line.

5. The measuring device as recited in claim 1, further comprising:
a differential pressure sensor which is arranged in the metering unit housing at the metering line, the differential pressure sensor being configured to measure a differential pressure via the flow meter.

6. The measuring device as recited in claim 1, further comprising:
a shut-off member via which the density sensor can be bypassed.

7. The measuring device as recited in claim 1, further comprising:
a proportional valve via which the delivery pump can be bypassed.

8. The measuring device as recited in claim 1, further comprising:
a safety valve via which the delivery pump can be bypassed.

9. The measuring device as recited in claim 1, wherein the recirculation line is further arranged to branch off geodetically upwards from the metering line downstream of the flow meter.

10. The measuring device as recited in claim 1, wherein the metering line is arranged to extend in a descending direction downstream of the flow meter.

11. The measuring device as recited in claim 1, further comprising:
a throttle which is arranged in the measuring unit housing downstream of the flow meter in the metering line.

12. The measuring device as recited in claim 11, wherein the throttle is configured as a sleeve which is introduced into the metering line so as to provide a cross-sectional constriction.

13. The measuring device as recited in claim 11, further comprising:
a shut-off valve which is arranged in the measuring unit housing downstream of the flow meter in the metering line and upstream of the fluid outlet.

14. The measuring device as recited in claim 13, wherein, the metering line is arranged to extend upwardly from the fluid outlet, and
the shut-off valve and the throttle are each arranged in an upwardly extending portion of the metering line.

15. The measuring device as recited in claim 14, wherein the upwardly extending portion of the metering line is made of a material with a thermal conduction coefficient of more than 30 W/mK and which is thermally insulated.

16. The measuring device as recited in claim 1, further comprising:
a fluid recirculation valve which is arranged in the recirculation line.

17. The measuring device as recited in claim 16, wherein the metering line is arranged to extend continuously upwardly from the fluid outlet into the recirculation line to the fluid recirculation valve.

18. The measuring device as recited in claim 1, wherein the flow meter is a Coriolis flow meter or a volume displacement meter.

19. The measuring device as recited in claim 1, wherein the pump unit housing is further detachably connected to the metering unit housing via a connection portion of the recirculation line.

20. A method of metering a fluid, the method comprising:
providing a measuring device comprising:
a container in which the fluid is stored;
a fluid inlet which is fluidically connected to the container;
a fluid outlet which is fluidically connectable with a metering point;
a metering line which connects the fluid inlet with the fluid outlet;
a delivery pump arranged in the metering line;
a density sensor arranged in the metering line;
a flow meter arranged in the metering line;
a recirculation line which is arranged to branch off from the metering line downstream of the flow meter and to open into the container;
a shut-off valve;
a temperature sensor; and
a fluid recirculation valve which is arranged in the recirculation line,
wherein,
the flow meter is arranged in a measuring unit housing which is arranged at a distance from a pump unit housing in which at least the delivery pump is arranged,
the pump unit housing is detachably connected to the measuring unit housing via a connection portion of the metering line, and the shut off valve is arranged in the measuring unit housing downstream of the flow meter in the metering line and upstream of the fluid outlet;

providing a fluid in the container of the measuring device;

recirculating the fluid via the metering line and the recirculation line;

discharging the fluid in a lower region of the container;

returning the fluid to an upper region of the container; and then metering the fluid at the metering point;

opening the fluid recirculation valve;

closing the shut-off valve in the metering line in the metering unit housing;

conveying the fluid in a circuit via the delivery pump until a temperature of the fluid at the temperature sensor is constant, and then switching off the delivery pump and closing the fluid recirculation valve, and then, switching on the delivery pump, opening the shut-off valve, and metering the fluid at the metering point while measuring a mass flow via the flow meter.

21. A measuring device for metering a fluid, the measuring device comprising:

a container in which the fluid is stored;

a fluid inlet which is fluidically connected to the container;

a fluid outlet which is fluidically connectable with a metering point;

a metering line which connects the fluid inlet with the fluid outlet;

a delivery pump arranged in the metering line;

a density sensor arranged in the metering line;

a flow meter arranged in the metering line; and a recirculation line which is arranged to branch off from the metering line downstream of the flow meter and to open into the container, wherein, the flow meter is arranged in a measuring unit housing which is arranged at a distance from a pump unit housing in which at least the delivery pump is arranged, the pump unit housing is detachably connected to the measuring unit housing via a connection portion of the metering line, the metering line is arranged to extend upwardly from the fluid outlet, and the shut-off valve and the throttle are each arranged in an upwardly extending portion of the metering line.

\* \* \* \* \*